US012224107B2

(12) United States Patent
Hashimoto et al.

(10) Patent No.: US 12,224,107 B2
(45) Date of Patent: Feb. 11, 2025

(54) COIL COMPONENT

(71) Applicant: Murata Manufacturing Co., Ltd., Kyoto-fu (JP)

(72) Inventors: Ryota Hashimoto, Nagaokakyo (JP); Atsuyoshi Maeda, Nagaokakyo (JP); Chihiro Yamaguchi, Nagaokakyo (JP); Hiroyuki Tei, Nagaokakyo (JP); Kohei Kobayashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 18/494,529

(22) Filed: Oct. 25, 2023

(65) Prior Publication Data

US 2024/0055175 A1 Feb. 15, 2024

Related U.S. Application Data

(60) Continuation of application No. 17/318,722, filed on May 12, 2021, now Pat. No. 11,830,657, which is a (Continued)

(30) Foreign Application Priority Data

Apr. 6, 2016 (JP) ................................ 2016-076247

(51) Int. Cl.
*H01F 27/28* (2006.01)
*H01F 27/29* (2006.01)

(52) U.S. Cl.
CPC ......... *H01F 27/2823* (2013.01); *H01F 27/29* (2013.01)

(58) Field of Classification Search
CPC ...... H01F 27/2823; H01F 27/29; H01F 17/04; H01F 17/045

(Continued)

(56) References Cited

U.S. PATENT DOCUMENTS 7,382,221 B2 6/2008 Morimoto et al.
2007/0171020 A1 7/2007 Morimoto et al.

(Continued)

FOREIGN PATENT DOCUMENTS

CN 1918676 A 2/2007
CN 103887041 A * 6/2014

(Continued)

OTHER PUBLICATIONS

An Office Action mailed by the Japanese Patent Office on Jul. 9, 2019, which corresponds to Japanese Patent Application No. 2016-076247 and is related to U.S. Appl. No. 15/470,254; with English language translation.

(Continued)

*Primary Examiner* — Tszfung J Chan

(74) *Attorney, Agent, or Firm* — Studebaker & Brackett PC

(57) ABSTRACT

First and second wires form a wire assembly by being wound around a winding core portion together. The wire assembly includes a twisted wire portion, an inner layer portion, an outer layer portion, a plurality of outward transition portions, and an inward transition portion. The outer layer portion includes a first outer layer portion which is connected to one of the outward transition portions extending from an intermediate position of the inner layer portion and connected to the inward transition portion. The inward transition portion extends to an intermediate position of the inner layer portion.

1 Claim, 12 Drawing Sheets

Related U.S. Application Data division of application No. 16/719,016, filed on Dec. 18, 2019, now Pat. No. 11,037,720, which is a division of application No. 15/470,254, filed on Mar. 27, 2017, now Pat. No. 10,600,554.

(58) Field of Classification Search
USPC .......... 336/83, 187, 188, 189, 192, 221, 222
See application file for complete search history.

(56) References Cited

U.S. PATENT DOCUMENTS

| | | | |
|---|---|---|---|
| 2014/0167903 | A1 | 6/2014 | Tomonari et al. |
| 2015/0206646 | A1 | 7/2015 | Dinh et al. |
| 2017/0263372 | A1 | 9/2017 | Ashizawa et al. |

FOREIGN PATENT DOCUMENTS

| | | | | |
|---|---|---|---|---|
| JP | S61-056591 | B | | 12/1986 |
| JP | S62-16504 | A | | 1/1987 |
| JP | H02-137206 | A | | 5/1990 |
| JP | H04-329606 | A | | 11/1992 |
| JP | 2005044858 | A | * | 2/2005 |
| JP | 2005-235922 | A | | 9/2005 |
| JP | 2008-034777 | A | | 2/2008 |
| JP | 2011-082463 | A | | 4/2011 |
| JP | 5239822 | B2 | | 7/2013 |
| JP | 5558609 | B1 | | 7/2014 |
| JP | 2014-207368 | A | | 10/2014 |
| JP | 2014-216525 | A | | 11/2014 |
| JP | 2017-163026 | A | | 9/2017 |
| WO | 2015/135703 | A1 | | 9/2015 |

OTHER PUBLICATIONS

An Office Action; "Notification of Reasons for Refusal," Mailed by the Japanese Patent Office on Feb. 26, 2019, which corresponds to Japanese Patent Application No. 2016-076247 and is related to U.S. Appl. No. 15/470,254 ; with English language translation.
An Office Action; "Notification of Reasons for Refusal," issued by the Japanese Patent Office on Oct. 2, 2018, which corresponds to Japanese Patent Application No. 2016-076247 and is related to U.S. Appl. No. 15/470,254; with English language translation.
An Office Action issued by Chinese Patent Office on May 30, 2018, which corresponds to Chinese Patent Application No. 201710068901.8 and is related to U.S. Appl. No. 15/470,254.

* cited by examiner

FIG. 4A REAL PART
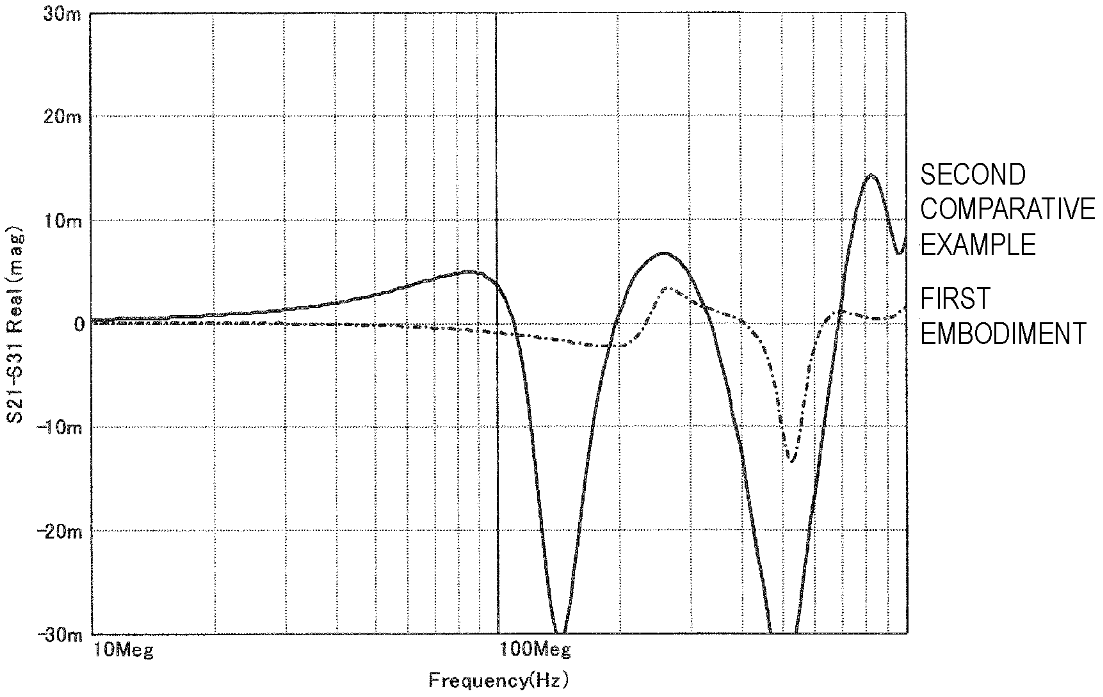
FIG. 4B IMAGINARY PART
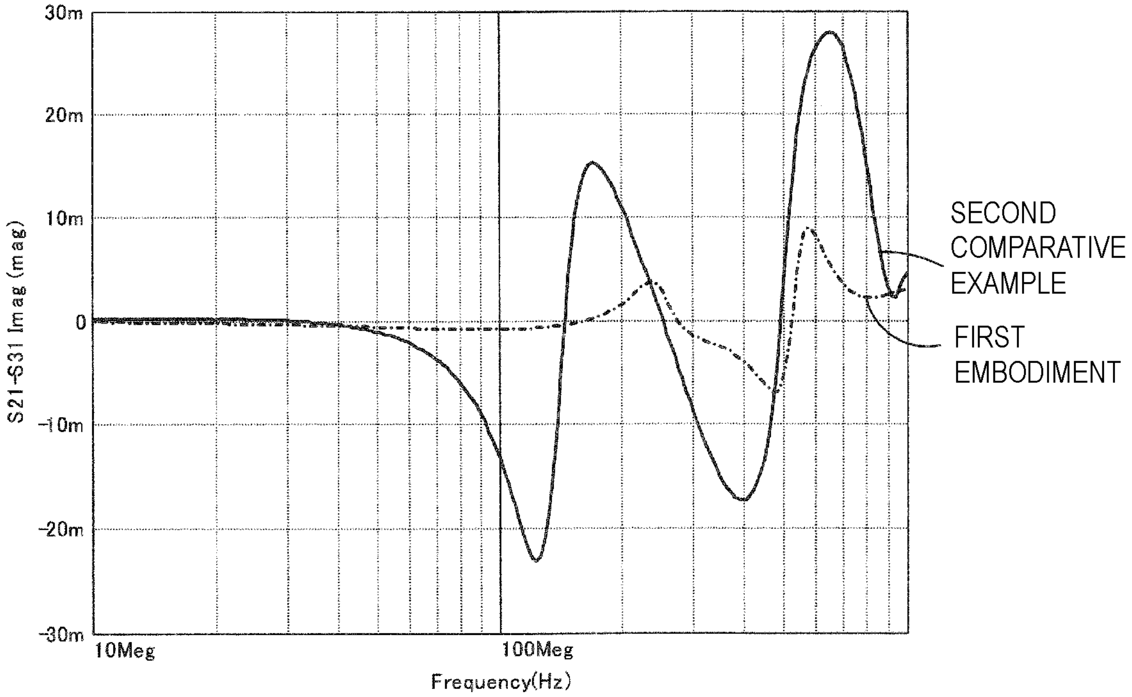

COIL COMPONENT

CROSS REFERENCE TO RELATED APPLICATIONS

This application is a Continuation of U.S. patent application Ser. No. 17/318,722 filed May 12, 2021, which is a Divisional of U.S. patent application Ser. No. 16/719,016 filed Dec. 18, 2019, which is a Divisional of U.S. patent application Ser. No. 15/470,254 filed Mar. 27, 2017, which claims benefit of priority to Japanese Patent Application 2016-076247 filed Apr. 6, 2016, the entire content of which is incorporated herein by reference.

TECHNICAL FIELD

The present disclosure relates to a coil component. In particular, the present disclosure relates to a coil component in which two wires that are twisted together are wound around a winding core portion.

BACKGROUND

A common mode choke coil is a representative example of a coil component at which the present disclosure aims.

For example, Japanese Unexamined Patent Application Publication No. 2014-207368 and Japanese Patent No. 5558609 disclose common mode choke coils, each of which includes a wire assembly formed of two wires wound around a winding core portion together in a twisted state.

SUMMARY

The present inventors considered a future technology that uses a wire assembly wound in the twisted state to improve mode conversion characteristics and achieve a high inductance that existing technologies cannot achieve with certain restrictions on the external shape of a coil component.

A simple idea is that an increase in the number of turns of the wire assembly is effective to achieve a high inductance.

However, when the wire assembly in a twisted state is wound, the wire assembly cannot neatly be arranged on the winding core portion without any space between turns because of the shape of the twisted wires themselves, that is, an uneven outer circumferential surface that the twisted wires form. In other words, when the wire assembly in the twisted state is wound around the winding core portion, a useless space is likely to be created. Accordingly, in the case where the wire assembly in the twisted state is wound around the winding core portion with predetermined dimensions, the number of turns of the wire assembly needs to be smaller than in the case where the wire assembly is in a singled state, the singled state means the wire assembly is not in the twisted state. It is consequently difficult to achieve a high inductance.

In view of this, it can be considered that the wire assembly in a twisted state is wound in two or more layers in order to increase the number of turns of the wire assembly. This will be described with reference to FIG. 18 to FIG. 20.

FIG. 17A, FIG. 17B, and FIG. 17C illustrate a wire assembly formed of two wires that is used in the drawings. FIG. 17A is an enlarged front view of a Z-twisted wire 43*z* formed of a first wire 41 and a second wire 42. FIG. 17B is an enlarged front view of an S-twisted wire 43*s* formed of the first wire 41 and the second wire 42. In the drawings, a wire assembly 44 formed of the first wire 41 and the second wire 42 is schematically illustrated by a single line as illustrated in FIG. 17C in either case of the Z-twisted wire 43*z*, the S-twisted wire 43*s*, or a non-twisted (singled) wire.

FIG. 18 and FIG. 19 are schematic sectional views of the wire assembly 44 formed of the first wire 41 and the second wire 42 that are wound around a winding core portion 45. Numerals illustrated in the section of the wire assembly 44 denote the number of turns of the wire assembly 44 around the winding core portion 45, which are referred to as turn ordinal numbers. The turn ordinal numbers in the section of the wire assembly 44 are illustrated also in the drawings of the same kind, which are described later.

In a common mode choke coil 51*m* illustrated in FIG. 18, the wire assembly 44 is in contact with and wound around the circumferential surface of the winding core portion 45 in a single layer from the first turn (referred to as "turn 1" below) to turn 16 so as to extend from a first end portion 46 of the winding core portion 45 to a second end portion 47 of the winding core portion 45. In a common mode choke coil 51*n* illustrated in FIG. 19, the wire assembly 44 is in contact with and wound around the circumferential surface of the winding core portion 45 between turn 1 and turn 16 so as to extend from the first end portion 46 of the winding core portion 45 to the second end portion 47 of the winding core portion 45. After that, the wire is returned to near the first end portion 46 of the winding core portion 45 and wound between turn 17 and turn 31 so as to form an outer layer portion around the outer circumference of an inner layer portion formed between turn 1 and turn 16.

The present inventors have found that the mode conversion characteristics, Sds21, of the common mode choke coil 51*n* illustrated in FIG. 19 is worse than the mode conversion characteristics of the common mode choke coil 51*m* illustrated in FIG. 18.

FIG. 20 illustrates S (Scattering) parameters, more specifically, the frequency characteristics of the Sds21 obtained to evaluate the mode conversion characteristics of the common mode choke coil 51*m* (first comparative example) including the wire assembly 44 in a single layer of 16 turns illustrated in FIG. 18 and the common mode choke coil 51*n* (second comparative example) including the wire assembly 44 in two layers of 31 turns illustrated in FIG. 19.

As seen in FIG. 20, compared with the first comparative example illustrated by a dotted line, the second comparative example illustrated by a solid line exhibits a higher level of Sds21 and greatly degraded mode conversion characteristics. That is, in the second comparative example, the mode conversion characteristics are greatly degraded, although it can be readily assumed that the number of turns of the wire assembly 44 is larger than in the first comparative example and the inductance is higher than in the first comparative example.

Such a problem is not limited to common mode choke coils but may occur in a coil component, such as a balun or a transformer, including two wires forming the wire assembly that are wound around the winding core portion together.

In view of this, it is an object of the present disclosure to provide a coil component with good mode conversion characteristics in which the number of turns of the wires is increased to achieve a high inductance while not increasing the size of the coil component.

According to one embodiment of the present disclosure, a coil component includes a drum-shaped core including a winding core portion and first and second flange portions disposed at respective opposing first and second end portions of the winding core portion, and first and second wires that are wound around the winding core portion and are not electrically connected to each other. The first and second wires form a wire assembly by being wound around the winding core portion together.

In the coil component according to the embodiment the wires are wound in the following manner.

The wire assembly includes a twisted wire portion at which the first and second wires are twisted together, an inner layer portion that is in contact with and wound around the circumferential surface of the winding core portion, an outer layer portion wound around the outer circumference of the inner layer portion, a plurality of outward transition portions each extending from the inner layer portion to the outer layer portion, and an inward transition portion extending from the outer layer portion to the inner layer portion. The outer layer portion includes a first outer layer portion which is connected to one of the outward transition portions extending from an intermediate position of the inner layer portion in a winding axial direction and connected to the inward transition portion. The inward transition portion extends to an intermediate position of the inner layer portion in the winding axial direction.

The first outer layer portion enables an increase in the number of turns of the first and second wires as a whole without increasing the size of the coil component. Since the first outer layer portion is formed of part of the wire assembly that extends from an intermediate position of the inner layer portion in the winding axial direction and extends to an intermediate position of the inner layer portion, the difference between the turn ordinal numbers of adjoining turns between part of the wire assembly forming the first outer layer portion and part of the wire assembly forming the inner layer portion disposed inside the first outer layer portion can be smaller than in the case of the second comparative example illustrated in FIG. 19. Accordingly, the combined line capacitance existing between the first and second wires with respect to common mode signals can be lower than in the case of the second comparative example illustrated in FIG. 19.

In the description of the present disclosure, the phrase "around the winding core portion" means a portion including not only a portion in contact with the circumferential surface of the winding core portion but also a portion across components, such as the wires, above the winding core portion. The phrase "an intermediate position of the inner layer portion in an axial direction of a winding" means the position of the inner layer portion other than the both end positions thereof and does not necessarily mean the position of a central portion of the inner layer portion. The intermediate position is not restricted to a point and may also be a range. For example, each of the intermediate positions from which the first outer layer portion extends and the intermediate position to which the first outer layer portion extends does not necessarily correspond exactly to a point but may correspond to the range between the position from which the first outer layer portion extends and the position to which the first outer layer portion extends.

According to another embodiment of the present disclosure, the wire assembly includes a plurality of the first outer layer portions. This suppresses the degradation of the mode conversion characteristics and enables an increase in the number of turns of the wire assembly, thereby increasing the inductance.

The outer layer portion preferably includes a second outer layer portion which is connected to one of the outward transition portions extending from an end position of the inner layer portion in a winding axial direction. The second outer layer portion suppresses the degradation of the mode conversion characteristics and enables an increase in the number of turns of the wire assembly, thereby increasing the inductance. In this case, the first and second wires may exist in contact with and wound around the winding core portion at a position over the end position of the inner layer portion to the first or second end portions of the winding core portion.

According to another embodiment of the present disclosure, the wire assembly may be wound so as to extend in a direction from the first end portion to the second end portion at the inner layer portion and the outer layer portion, or the wire assembly may be wound so as to extend in a direction from the first end portion to the second end portion at the inner layer portion and wound so as to extend in a direction from the second end portion to the first end portion. In particular, in the former case, the difference between the turn ordinal numbers of adjoining turns between part of the wire assembly forming the first outer layer portion and part of the wire assembly forming the inner layer portion disposed inside the first outer layer portion can be further decreased. The latter case enables the outward transition portions to be shorter than in the former case and enables a decrease in variations in characteristics, a reduction in the size of the coil component, and an improvement in reliability and manufacturing efficiency.

According to another embodiment of the present disclosure, it is preferable that the number of the outward transition portions be not less than 2 and not more than 5. The difference between the turn ordinal numbers of portions between the inner layer portion and the outer layer portion, at which a line capacitance exists, can be decreased in a manner in which the number of the outward transition portions is increased.

According to another embodiment of the present disclosure, the number of turns of the wire assembly is 15 or more. In this case, when the planer dimension of a common mode choke coil is, for example, about 4.5 mm×3.2 mm, the common mode choke coil can have an inductance of 50 μH or more.

According to another embodiment of the present disclosure, it is preferable that the number of twists of the twisted wire portion is not less than 0.5 and not more than 8 per turn. In the case where the number of twists is thus a predetermined value or more, the mode conversion characteristics can be further improved. In the case where the number of twists is a predetermined value or less, the reliability and manufacturing efficiency of the coil component can be improved.

It is preferable that each of the inner layer portion and the outer layer portion includes the twisted wire portion. An increase in the number of the twisted wire portions enables the characteristics to be improved.

It is preferable that each of the outward transition portion and the inward transition portion does not include the twisted wire portion. The outward transition portion is a portion on which the outer layer portion is wound. The inward transition portion is the outermost portion of the wire assembly. The outward transition portion and the inward transition portion affect a state where the wire assembly is wound. Accordingly, in the case where the outward transition portion and the inward transition portion are not the twisted wire portions, at which the state of the winding is greatly disordered, the state where the wire assembly is wound is appropriate, and its variation can be decreased. In addition, the wire assembly can be stably wound in a manufacturing process.

The coil component according to another embodiment of the present disclosure preferably includes first and second terminal electrodes, third and fourth terminal electrodes, and a plate core. The first and second flange portions preferably each have a surface parallel to the winding axial direction. The first and second terminal electrodes are preferably disposed on the surface of the first flange portion and connected to a first end of the first wire and a first end of the second wire. The third and fourth terminal electrodes are preferably disposed on the surface of the second flange portion and connected to a second end of the first wire and a second end of the second wire. The plate core is preferably in contact with the first and second flange portions on a side opposite to the surface and preferably extends between the first and second flange portions. It is preferable that the outward transition portions and the inward transition portion be not located above part of the winding core portion facing the plate core. In this case, it is preferable that the outward transition portions and the inward transition portion be not located above part of the winding core portion facing the plate core or above part of the winding core portion that is opposite to the part of the winding core portion facing the plate core, or be not located above both of these parts.

There is a possibility that the outward transition portion and the inward transition portion themselves cause the winding of the wire assembly to expand partially at the positions of the outward transition portion and the inward transition portion. With the above structure, however, the partial expansions of the winding of the wire assembly can be prevented from being located at the part of the winding core portion facing the plate core and the opposite part, which are likely to be spatially limited. The winding core portion can consequently be thickened while maintaining the same external shape. This enables the electrical characteristics to be improved and enables the mechanical strength to be increased. In the case where the partial expansions of the winding of the wire assembly are not located on the part of the winding core portion that is opposite to the part of the winding core portion facing the plate core, the distance between the wires and a mounting substrate can be larger than in the case where the partial expansions are located on the part of the winding core portion that is opposite to the part of the winding core portion facing the plate core. Accordingly, a stray capacitance existing between the wires and the mounting substrate can be decreased, and an effect of noise being picked up by and emitted from the coil component can be reduced.

According to another embodiment of the present disclosure, the sectional shape of the winding core portion in a direction perpendicular to the axial direction of the winding is preferably a circle, an ellipse, or a polygon with rounded corners. In the case where the sectional shape of the winding core portion is thus selected, the shape of the winding of the wire assembly is unlikely to change, and the first wire and the second wire can be readily balanced successfully. In particular, the shape of the winding of a twisted wire portion is likely to change, and the selection of the above sectional shape of the winding core portion brings about a stronger positive effect than in the case where no twisted (singled) wire portion is included.

According to the embodiments of the present disclosure, a high inductance can be achieved without increasing the size of the coil component, and good mode conversion characteristics can be achieved.

Other features, elements, characteristics and advantages of the present disclosure will become more apparent from the following detailed description with reference to the attached drawings.

BRIEF DESCRIPTION OF THE DRAWINGS

FIG. 4A illustrates the real part of the frequency characteristics of a difference S21−S31 between S21 and S31, which are parameters of mode conversion characteristics, in the common mode choke coil (first embodiment) illustrated in FIG. 1A, FIG. 1B, and FIG. 2 and the common mode choke coil (second comparative example) illustrated in FIG. 19.

FIG. 4B illustrates the imaginary part of the frequency characteristics of a difference S21−S31 between S21 and S31, which are parameters of mode conversion characteristics, in the common mode choke coil (first embodiment) illustrated in FIG. 1A, FIG. 1B, and FIG. 2 and the common mode choke coil (second comparative example) illustrated in FIG. 19.

DETAILED DESCRIPTION

First Embodiment

Figure 1A:
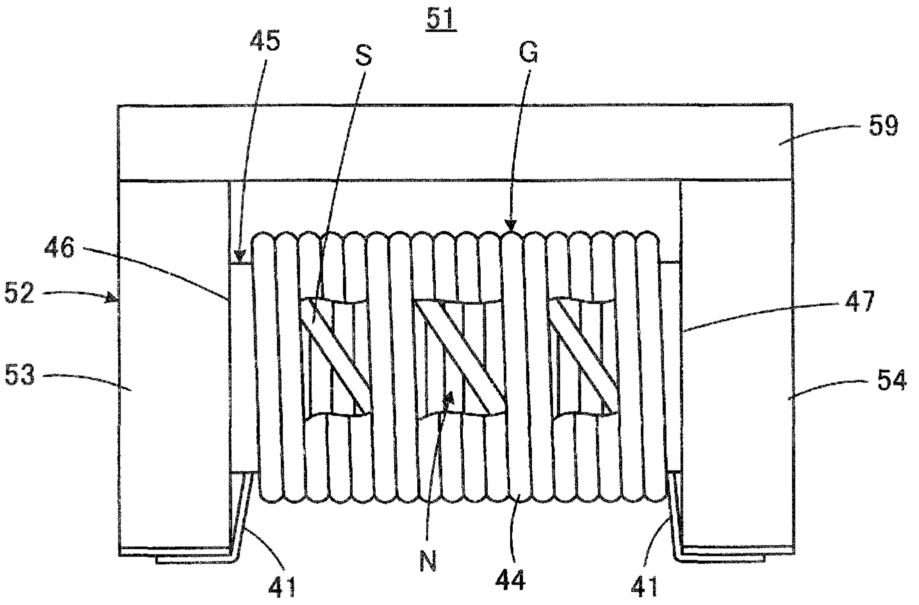
FIG. 1A is a front view of a common mode choke coil that is a coil component according to a first embodiment of the present disclosure.
Figure 1B:
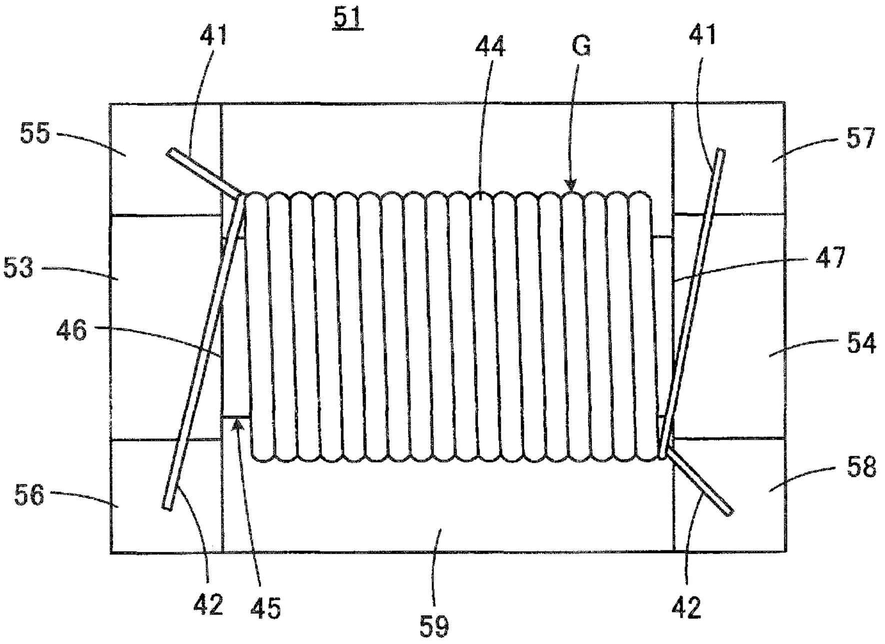
FIG. 1B is a bottom view of the common mode choke coil illustrating its surface directed at a mounting substrate side.
Figure 2:
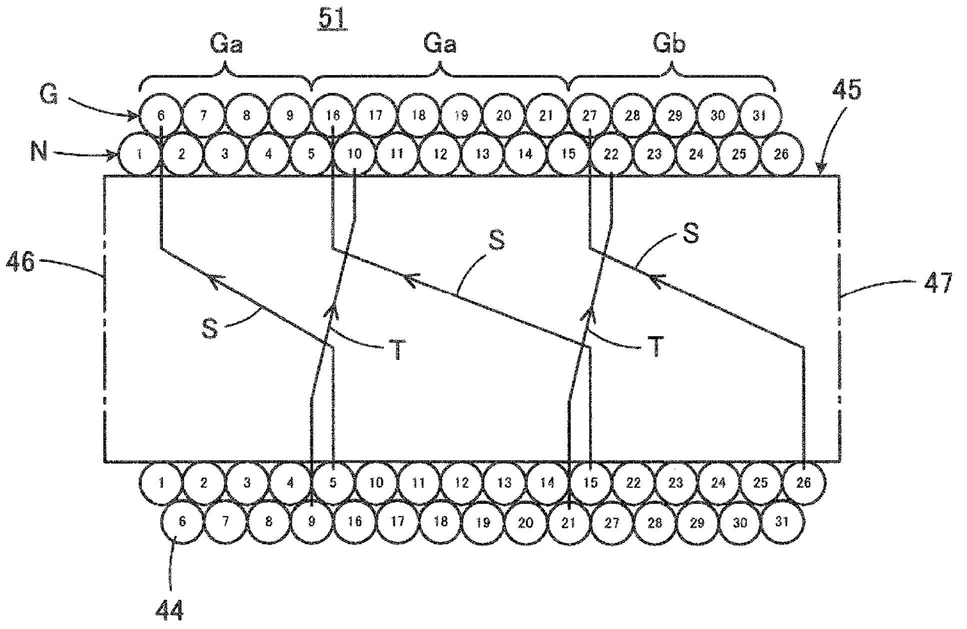
FIG. 2 is a schematic sectional view of the common mode choke coil illustrated in FIG. 1A and FIG. 1B and illustrates a state where a wire assembly formed of first and second wires is wound.

A common mode choke coil 51 that is a coil component according to a first embodiment of the present disclosure will be described with reference to FIG. 1A, FIG. 1B, and FIG. 2. In FIG. 1A, FIG. 1B, and FIG. 2, components corresponding to the components illustrated in FIG. 17A to FIG. 19 are designated by like symbols.

The common mode choke coil 51 includes a drum-shaped core 52 and the first wire 41 and the second wire 42 that form an inductor. In FIG. 1A and FIG. 1B, the first wire 41 and the second wire 42 are individually illustrated only at their end portions, and their intermediate portions are schematically illustrated as the wire assembly 44 formed of the first wire 41 and the second wire 42 that is in a state of a single wire as described with reference to FIG. 17A, FIG. 17B, and FIG. 17C. The drum-shaped core 52 is composed of an electrical insulation material, more specifically, a non-magnetic material such as alumina, a magnetic material such as Ni—Zn ferrite, or a resin. The wires 41 and 42 are each composed of, for example, a copper wire coated with an insulator.

The drum-shaped core 52 includes the winding core portion 45, a first flange portion 53 and a second flange portion 54 that are respectively disposed at the first end portion 46 and the second end portion 47 of the winding core portion 45 that are opposite to each other. The most part of the first wire 41 and second wire 42 is schematically illustrated as the wire assembly 44. The first wire 41 and the second wire 42 are helically wound around the winding core portion 45 in the same direction so as to be parallel to each other between the first end portion 46 adjacent to the first flange portion 53 and the second end portion 47 adjacent to the second flange portion 54. Typically, the number of turns of the first wire 41 is substantially the same as the number of turns of the second wire 42.

A first terminal electrode 55 and a second terminal electrode 56 are disposed on the first flange portion 53. A third terminal electrode 57 and a fourth terminal electrode 58 are disposed on the second flange portion 54. The terminal electrodes 55 to 58 are formed by, for example, baking of a conductive paste, plating of a conductive metal, or attachment of a conductive metallic piece.

Both end portions of the first wire 41 are connected to the first terminal electrode 55 and the third terminal electrode 57. Both end portions of the second wire 42 are connected to the second terminal electrode 56 and the fourth terminal electrode 58. For example, thermo-compression bonding or welding is used for the connection.

The common mode choke coil 51 also includes a plate core 59. The plate core 59 is composed of a non-magnetic material such as alumina, a magnetic material such as Ni—Zn ferrite, or a resin as in the case of the drum-shaped core 52. In the case where the drum-shaped core 52 and the plate core 59 are made of a magnetic material, the drum-shaped core 52 and the plate core 59 form a closed magnetic circuit in a manner in which the plate core 59 is disposed so as to connect the first flange portion 53 and the second flange portion 54 to each other.

FIG. 2 is a schematic sectional view of the common mode choke coil 51 having the above structure and illustrates a state where the wire assembly 44 formed of the first wire 41 and the second wire 42 is wound. FIG. 1A, FIG. 1B, and FIG. 2 are schematic diagrams, and accordingly, the number of turns of the wire assembly 44 illustrated in FIG. 1A and FIG. 1B differs from the number of turns of the wire assembly 44 illustrated in FIG. 2. The state where the wire assembly 44 is wound is described mainly with reference to FIG. 2.

The wire assembly 44 includes a twisted wire portion at which the first wire 41 and the second wire 42 are twisted together and forms the following: A) an inner layer portion N that extends from the side of the first end portion 46 and is in contact with and wound around the circumferential surface of the winding core portion 45, B) an outer layer portion G wound around the outer circumference of the inner layer portion N, C) outward transition portions S extending from the inner layer portion N to the outer layer portion G, and D) inward transition portions T extending from the outer layer portion G to the inner layer portion N.

The outer layer portion G is divided into two first outer layer portions Ga each formed of part of the wire assembly 44 that is connected to one of the outward transition portions S extending from an intermediate position of the inner layer portion N in the axial direction of a winding and is connected to one of the inward transition portions T extending to an intermediate position of the inner layer portion N and a second outer layer portion Gb formed of part of the wire assembly 44 that is connected to the other outward transition portion S extending from an end position of the inner layer portion N near the second end portion 47.

How to wind the wire assembly 44 will now be described by using the turn ordinal numbers in the wire assembly 44 illustrated around the winding core portion 45. Part of the inner layer portion N is first formed between turn 1 and turn 5. One of the outward transition portions S is subsequently formed by a portion between turn 5 and turn 6. One of the first outer layer portions Ga is subsequently formed between turn 6 and turn 9. One of the inward transition portions T is subsequently formed by a portion between turn 9 and turn 10.

Part of the inner layer portion N is subsequently formed between turn 10 and turn 15. Another outward transition portion S is subsequently formed by a portion between turn 15 and turn 16. The other first outer layer portion Ga is subsequently formed between turn 16 and turn 21. The other inward transition portion T is subsequently formed by a portion between turn 21 and turn 22.

The rest of the inner layer portion N is subsequently formed between turn 22 and turn 26. The other outward transition portion S is subsequently formed by a portion between turn 26 and turn 27. The second outer layer portion Gb is subsequently formed between turn 27 and turn 31.

As illustrated in FIG. 1A and FIG. 1B, one end (a first end) of the wire assembly 44 is divided into the first wire 41 and the second wire 42, which are respectively connected to the first terminal electrode 55 and the second terminal electrode 56. The other end (a second end) of the wire assembly 44 is also divided into the first wire 41 and the second wire 42, which are respectively connected to the third terminal electrode 57 and the fourth terminal electrode 58.

In FIG. 1A, the outer layer portion G included in the wire assembly 44 is partially cut to view the inner layer portion N through the cut portions. It can be also seen that the outward transition portions S extend across several turns of the inner layer portion N. The cut portions are illustrated only by way of illustration, and practically, the common mode choke coil 51 does not include the cut portions.

The outward transition portions S and the inward transition portions T extend around the winding core portion 45 within the range of less than 0.5 turns.

The embodiment has the following features.

The wire assembly 44 includes a plurality of the first outer layer portions Ga, specifically, two of the first outer layer portions Ga. This suppresses the degradation of the mode conversion characteristics and enables an increase in the number of turns of the wire assembly 44, thereby increasing the inductance.

The outer layer portion G includes the first outer layer portions Ga and the second outer layer portion Gb. This also suppresses the degradation of the mode conversion characteristics and enables an increase in the number of turns of the wire assembly.

The wire assembly 44 at the outer layer portion G is wound so as to extend in the direction from the first end portion 46 to the second end portion 47. Accordingly, the difference between the turn ordinal numbers of adjoining turns between part of the wire assembly 44 forming the outer layer portion G and part of the wire assembly 44 forming the inner layer portion N disposed inside the outer layer portion G can be smaller than in the case where the wire assembly 44 is wound so as to extend in the direction from the second end portion 47 to the first end portion 46 (see FIG. 12).

Three of the outward transition portions S are disposed around the winding core portion 45. The difference between the turn ordinal numbers of portions between the inner layer portion N and the outer layer portion G, at which a line capacitance exists, can be decreased in a manner in which the number of the outward transition portions S is increased, and a combined stray capacitance that the wire assembly 44 has with respect to common mode signals can be decreased. Accordingly, the degradation of the mode conversion characteristics can be suppressed, and the inductance can be increased.

The number of turns of the wire assembly 44 around the winding core portion 45 is 31, which is 15 or more. The common mode choke coil 51, in which the number of turns is 15 or more, can have an inductance of 50 μH or more in the case where its planer dimension is, for example, about 4.5 mm×3.2 mm.

The number of twists of the twisted wire portion of the first wire 41 and the second wire 42 is not less than 0.5 and not more than 8 per turn, preferably not less than 4 and not more than 8 per turn, although this is not illustrated. In the case where the number of twists is thus a predetermined value or more, the mode conversion characteristics can be further improved. In the case where the number of twists is a predetermined value or less, the reliability and manufacturing efficiency of the common mode choke coil 51 can be improved.

Each of the outward transition portions S and the inward transition portions T does not include the twisted wire portion, although this is not illustrated. The outward transition portions S are portions around which the outer layer portion G is wound. The inward transition portions T are the outermost portions of the wire assembly 44. The outward transition portions S and the inward transition portions T affect a state where the wire assembly 44 is wound. Accordingly, in the case where the outward transition portions S and the inward transition portions T are not the twisted wire portions, at which the state of the winding is greatly disordered, the state where the wire assembly 44 is wound is appropriate, and its variation can be decreased. In addition, the wire assembly 44 can be stably wound in a manufacturing process.

Figures 17A, 17B, 17C:
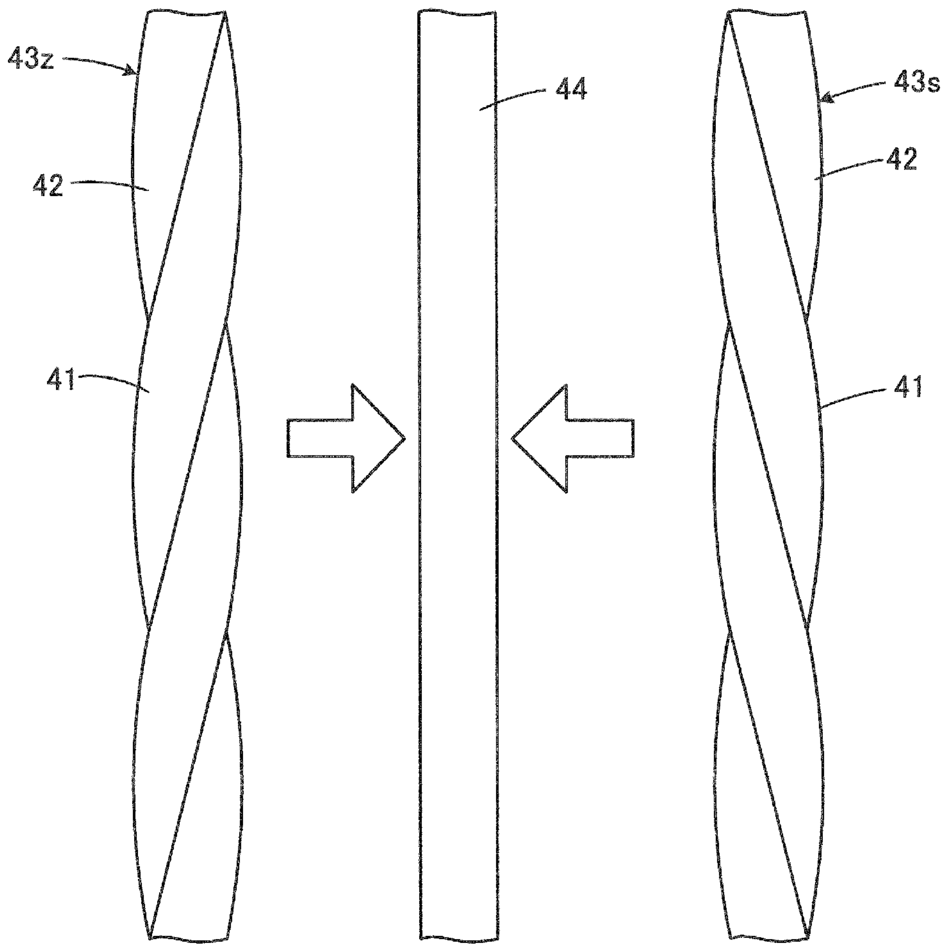
FIG. 17A illustrates a Z-twisted wire formed of a first wire and a second wire.
FIG. 17B illustrates an S-twisted wire formed of the first wire and the second wire.
FIG. 17C illustrates a wire assembly formed of two wires that is used in the drawings.

The direction in which the wire assembly 44 is twisted may be changed between the Z-twist illustrated in FIG. 17A and the S-twist illustrated in FIG. 17B at a midway position of the wire assembly 44, although this is not illustrated. The change in the direction of the twist can be readily performed with reference to Japanese Patent No. 5239822.

As seen from the positions of the outward transition portions S illustrated in FIG. 1A, the outward transition portions S and the inward transition portions T are not located above the part of the winding core portion 45 facing the plate core 59 nor the part of the winding core portion 45 that is opposite to the part of the winding core portion 45 facing the plate core 59. There is a possibility that the outward transition portions S and the inward transition portions T themselves cause the winding of the wire assembly 44 to expand partially at the positions of the outward transition portions S and the inward transition portions T. With the above structure, however, the partial expansions of the winding of the wire assembly 44 can be prevented from being located at the part of the winding core portion 45 facing the plate core 59 and the opposite part, which are likely to be spatially limited. The winding core portion 45 can consequently be thickened while maintaining the same external shape. This enables the electrical characteristics to be improved and enables the mechanical strength to be increased.

The above features are applied to the other embodiments unless otherwise specified.

Figure 3:
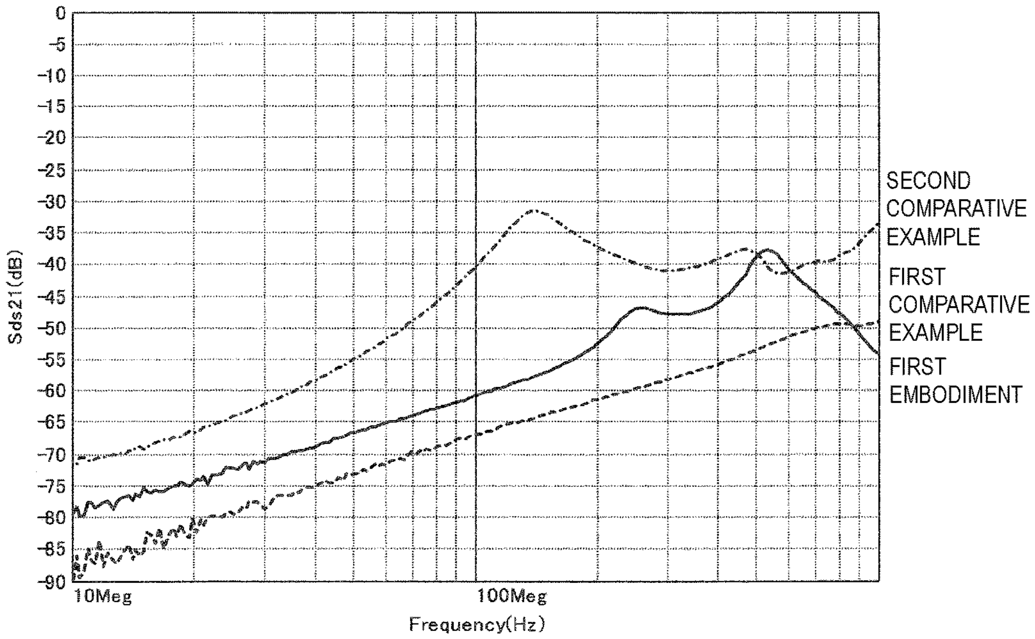
FIG. 3 illustrates a comparison of frequency characteristics of S (Scattering) parameter (Sds21) between the common mode choke coil (first embodiment) illustrated in FIG. 1A, FIG. 1B, and FIG. 2, a common mode choke coil (first comparative example) illustrated in FIG. 18, and a common mode choke coil (second comparative example) illustrated in FIG. 19.
Figure 20:
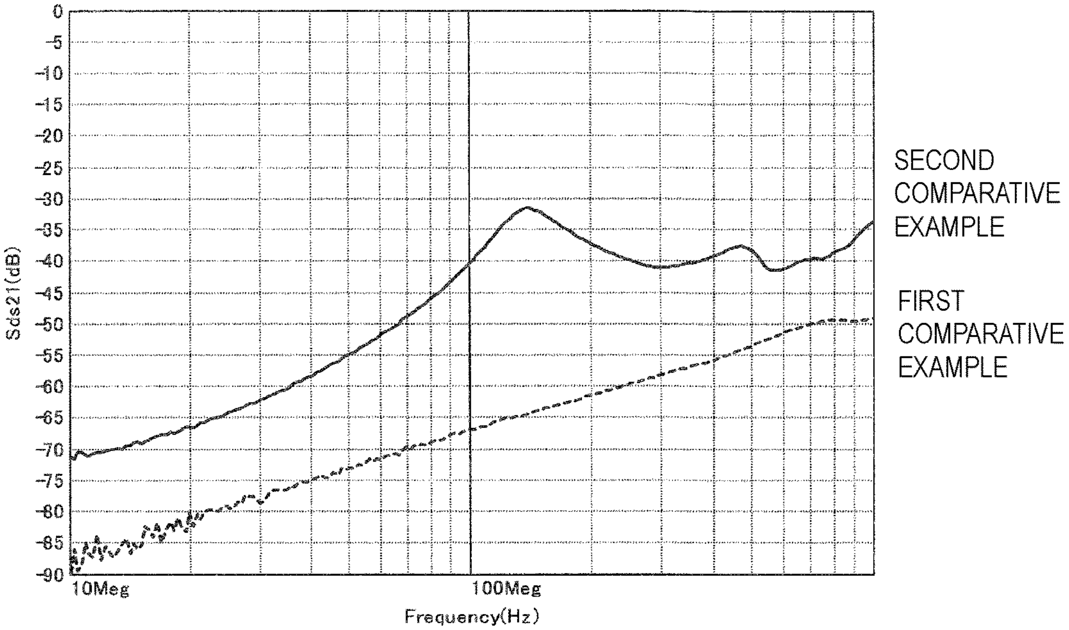
FIG. 20 illustrates a comparison of the frequency characteristics of S (Scattering) parameter (Sds21) between the common mode choke coil (first comparative example) illustrated in FIG. 18 and the common mode choke coil (second comparative example) illustrated in FIG. 19.

FIG. 3 illustrates the frequency characteristics of S (Scattering) parameter (Sds21) of the common mode choke coil 51 illustrated in FIG. 1A, FIG. 1B, and FIG. 2. In FIG. 3, the Sds21 of the common mode choke coil (first comparative example) in FIG. 18 and the Sds21 of the common mode choke coil (second comparative example) in FIG. 19, which are illustrated also in FIG. 20, are illustrated to readily evaluate the mode conversion characteristics of the common mode choke coil 51. In FIG. 3, the Sds21 of the common mode choke coil 51 (first embodiment) is illustrated by a solid line, the Sds21 in the first comparative example is illustrated by a dotted line, and the Sds21 in the second comparative example is illustrated by a one-dot chain line.

As illustrated in FIG. 3, the mode conversion characteristics (Sds21) in the first comparative example is the best, and the mode conversion characteristics (Sds21) in the first embodiment is better than in the second comparative example.

In the first comparative example, as described above, the wire assembly 44 is wound in a single layer. Accordingly, there is no line capacitance existing between the inner layer side and the outer layer side of the wire assembly 44, and the mode conversion characteristics in the first comparative example is the best. In the first embodiment and the second comparative example, the line capacitance exists between the inner layer side and the outer layer side of the wire assembly 44. Accordingly, the mode conversion characteristics in the first embodiment and the second comparative example is worse than in the first comparative example.

Comparing the first embodiment with the second comparative example, the difference between the turn ordinal numbers of the inner layer side of the wire assembly 44 and the outer layer side of the wire assembly 44 in the first embodiment is smaller than in the second comparative example.

In the first embodiment, for example, turn 2 on the inner layer side of the wire assembly 44 is adjacent to turn 6 and turn 7 on the outer layer side of the wire assembly 44. Turn 10 on the inner layer side of the wire assembly 44 is adjacent to turn 16 and turn 17 on the outer layer side of the wire assembly 44. Turn 22 on the inner layer side of the wire assembly 44 is adjacent to turn 27 and turn 28 on the outer layer side of the wire assembly 44. Accordingly, the difference between the turn ordinal numbers of the inner layer side of the wire assembly 44 and the outer layer side of the wire assembly 44 is in the range of 4 to 7.

In contrast, in the second comparative example, turn 2 on the inner layer side of the wire assembly 44 is adjacent to turn 17 and turn 18 on the outer layer side of the wire assembly 44. Accordingly, the difference between the turn ordinal numbers of the inner layer side of the wire assembly 44 and the outer layer side of the wire assembly 44 is in a wider range of 15 to 16.

Accordingly, the line capacitance that the entire wire assembly 44 has with respect to common mode signals in the first embodiment is lower than in the second comparative example. It is assumed that the difference between the line capacitances is the reason why the mode conversion characteristics in the first embodiment is better than in the second comparative example.

Data on which the assumption is based will now be described.

Figure 5:
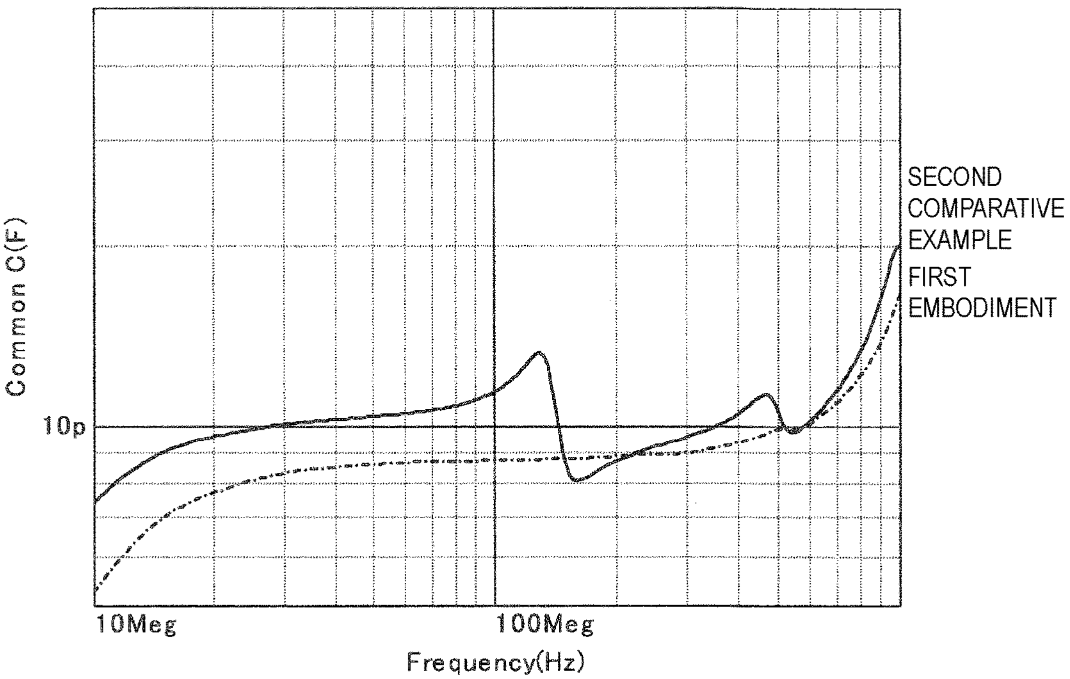
FIG. 5 illustrates the frequency characteristics of the stray capacitance of the entire common mode choke coil (first embodiment) illustrated in FIG. 1A, FIG. 1B, and FIG. 2 and the entire common mode choke coil (second comparative example) illustrated in FIG. 19 that are in a common mode.

FIG. 4A illustrates the real part of the frequency characteristics of a difference S21−S31 between S21 and S31, which are parameters of the mode conversion characteristics, in the first embodiment and the second comparative example, and FIG. 4B illustrates the imaginary part thereof. The value of S21−S31 illustrated in FIG. 4A and FIG. 4B can be evaluated such that the closer the real part and the imaginary part are to 0, the better the mode conversion characteristics. FIG. 5 illustrates the frequency characteristics of the stray capacitance of the entire coil in a common mode in the first embodiment and the second comparative example.

Normally, no correlation between S21−S31 illustrated in FIG. 4A and FIG. 4B and the common mode capacitance illustrated in FIG. 5 can be imagined. The present inventors, however, have found that, in the second comparative example, the value of S21−S31 is very far from 0 in the frequency range in which the common mode capacitance peaks, and the mode conversion characteristics are degraded when referring to S21−S31 illustrated in FIG. 4A and FIG. 4B and the common mode capacitance illustrated in FIG. 5. In the first embodiment, the common mode capacitance illustrated in FIG. 5 exhibits no conspicuous peak, the value of S21−S31 illustrated in FIG. 4A and FIG. 4B is closer to 0 than in the second comparative example, and the mode conversion characteristics are good.

Thus, the present inventors have found that there is a correlation between S21−S31 illustrated in FIG. 4A and FIG. 4B and the common mode capacitance illustrated in FIG. 5.

The present inventors have considered to reduce (prevent an increase in) the peaks of the common mode capacitance and conceived of the following. In a common mode, signals are transmitted through the two wires forming the wire assembly in the same phase, and no stray capacitance exists between two wires having the same turn ordinal number because the wires have the same potential. Accordingly, the idea that a single wire in a common mode has a decreased capacitance can be applied also to the case of the two twisted wires.

More specifically, in the second comparative example, the wire assembly 44 is wound in two layers, and the difference between the turn ordinal numbers of the inner layer side of the wire assembly 44 and the outer layer side of the wire assembly 44 is large as described above. In the case where the difference between the turn ordinal numbers of the adjoining turns is increased, the line capacitance between the turns has a relatively strong effect on the stray capacitance of the entire common mode choke coil, and a large line capacitance is created accordingly.

In contrast, in the first embodiment, the first outer layer portions Ga are formed of part of the wire assembly 44 that extends from an intermediate position of the inner layer portion N in the axial direction of the winding and extends to an intermediate position of the inner layer portion N. Accordingly, the difference between the turn ordinal numbers of the adjoining turns between part of the wire assembly 44 forming the first outer layer portions Ga and part of the wire assembly 44 forming the inner layer portion N disposed inside the first outer layer portions Ga can be smaller than in the case of the second comparative example. As illustrated in FIG. 5, the common mode capacitance in the first embodiment can consequently be lower than in the case of the second comparative example.

Figure 18:
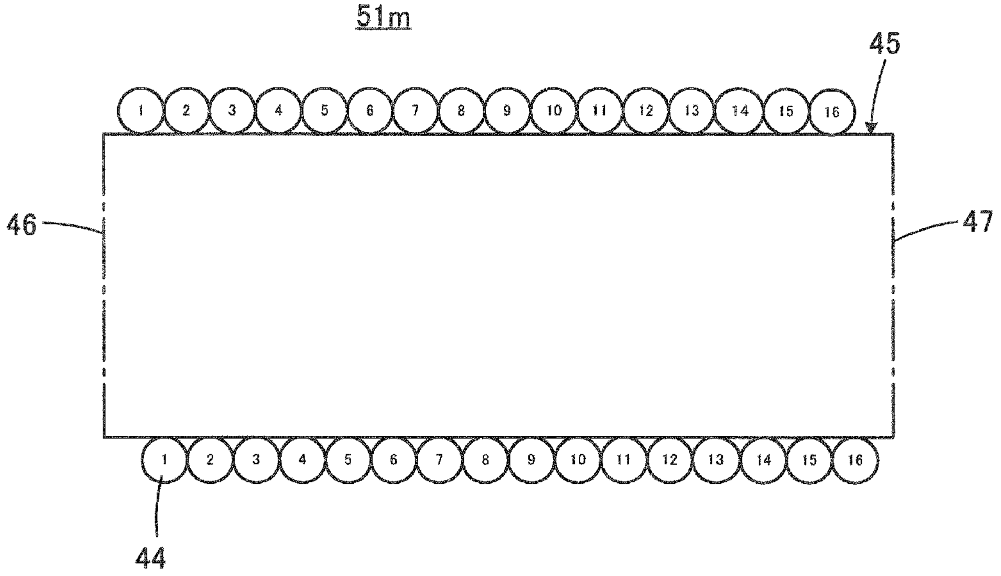
FIG. 18 is a diagram corresponding to FIG. 2 for illustrating the problem that the present disclosure solves and illustrates the common mode choke coil (first comparative example) including a wire assembly of 16 turns in a single layer.
Figure 19:
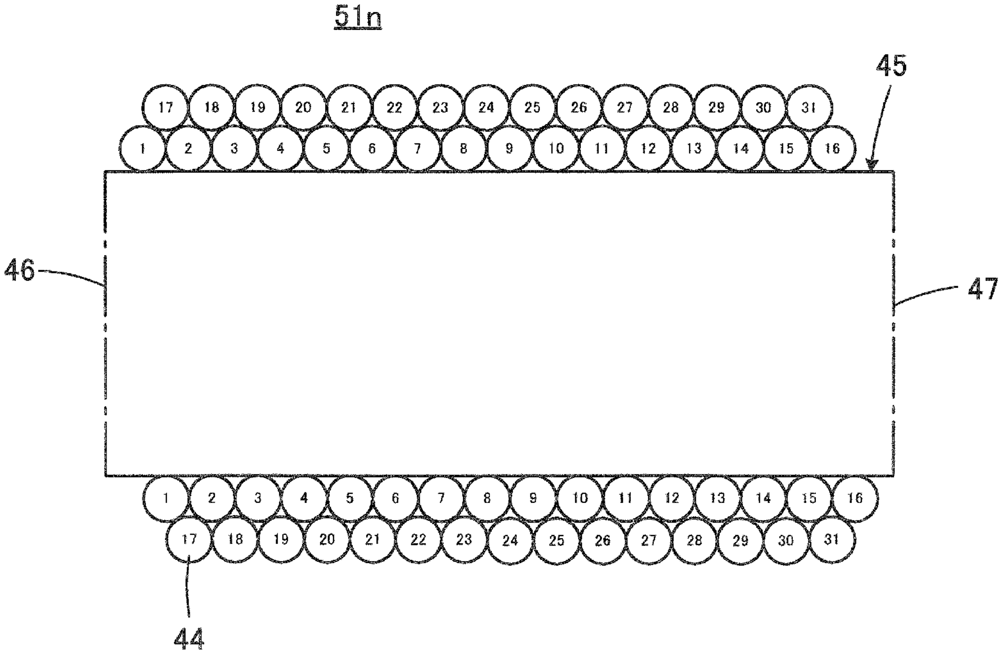
FIG. 19 is a diagram corresponding to FIG. 2 for illustrating the problem that the present disclosure solves and illustrates the common mode choke coil (second comparative example) including a wire assembly of 31 turns in two layers.

In the first comparative example illustrated in FIG. 18 for reference, the wire assembly 44 is wound in a single layer. Accordingly, the wire assembly 44 is not divided into the inner layer side and the outer layer side unlike the above structure. That is, the line capacitance (i.e., series capacitance) exists only between continuous turn ordinal numbers, a line capacitance (parallel capacitance) having a strong effect on the total stray capacitance, which exists between turn ordinal numbers having a large difference from each other, is not created, and the total stray capacitance is low.

Comparing the number of turns of the wire assembly 44, the number of turns of the wire assembly 44 in the first embodiment and the second comparative example is 31, but the number of turns of the wire assembly 44 in the first comparative example is 16, which is smaller than in the first embodiment and the second comparative example. Accordingly, it can be readily assumed that the inductance in the first embodiment and the second comparative example is higher than in the first comparative example.

In full consideration of the above findings, only the first embodiment can achieve both good mode conversion characteristics and a high inductance.

Second Embodiment

Figure 6:
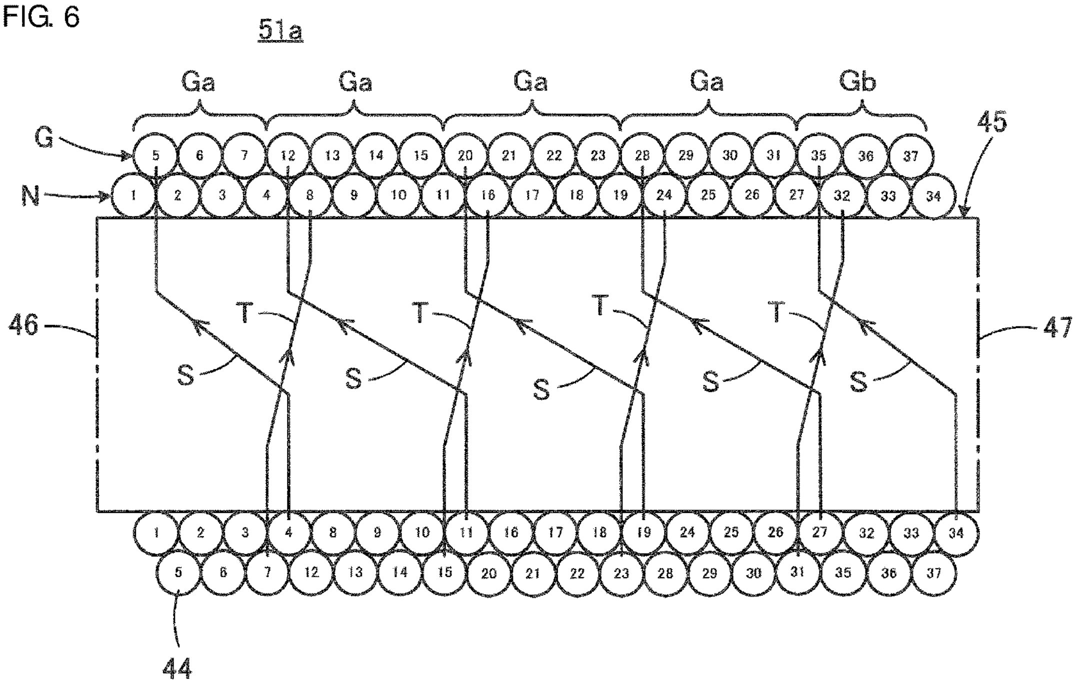
FIG. 6 is a diagram corresponding to FIG. 2 and illustrates a common mode choke coil according to a second embodiment of the present disclosure.

A common mode choke coil 51*a* according to a second embodiment of the present disclosure will now be described with reference to FIG. 6. In FIG. 6, and FIG. 8 to FIG. 15, which are described later, components corresponding to the components illustrated in FIG. 2 are designated by like symbols, and a duplicated description is omitted.

The number of turns of the wire assembly 44 of the common mode choke coil 51*a* is larger than in the common mode choke coil 51. More specifically, the number of turns is 37. In the common mode choke coil 51, there are three outward transition portions S around the winding core portion 45. In the common mode choke coil 51*a*, there are five outward transition portions S therearound. Accordingly, in the common mode choke coil 51*a*, the outer layer portion G is divided into five portions, and more specifically, four first outer layer portions Ga and a second outer layer portion Gb are formed.

How to wind the wire assembly 44 in the common mode choke coil 51*a* will now be described by using the turn ordinal numbers in the wire assembly 44 illustrated around the winding core portion 45. Part of the inner layer portion N is first formed between turn 1 and turn 4. One of the outward transition portions S is subsequently formed by a portion between turn 4 and turn 5. One of the first outer layer portions Ga is subsequently formed between turn 5 and turn 7. One of the inward transition portions T is subsequently formed by a portion between turn 7 and turn 8.

Part of the inner layer portion N is subsequently formed between turn 8 and turn 11. Another outward transition portion S is subsequently formed by a portion between turn 11 and turn 12. Another first outer layer portion Ga is subsequently formed between turn 12 and turn 15. Another inward transition portion T is subsequently formed by a portion between turn 15 and turn 16.

Part of the inner layer portion N is subsequently formed between turn 16 and turn 19. Another outward transition portion S is subsequently formed by a portion between turn 19 and turn 20. Another first outer layer portion Ga is subsequently formed between turn 20 and turn 23. Another inward transition portion T is subsequently formed by a portion between turn 23 and turn 24.

Part of the inner layer portion N is subsequently formed between turn 24 and turn 27. Another outward transition portion S is subsequently formed by a portion between turn 27 and turn 28. The other first outer layer portion Ga is subsequently formed between turn 28 and turn 31. The other inward transition portion T is subsequently formed by a portion between turn 31 and turn 32.

The rest of the inner layer portion N is subsequently formed between turn 32 and turn 34. The other outward transition portion S is subsequently formed by a portion between turn 34 and turn 35. The second outer layer portion Gb is subsequently formed between turn 35 and turn 37.

Figure 7:
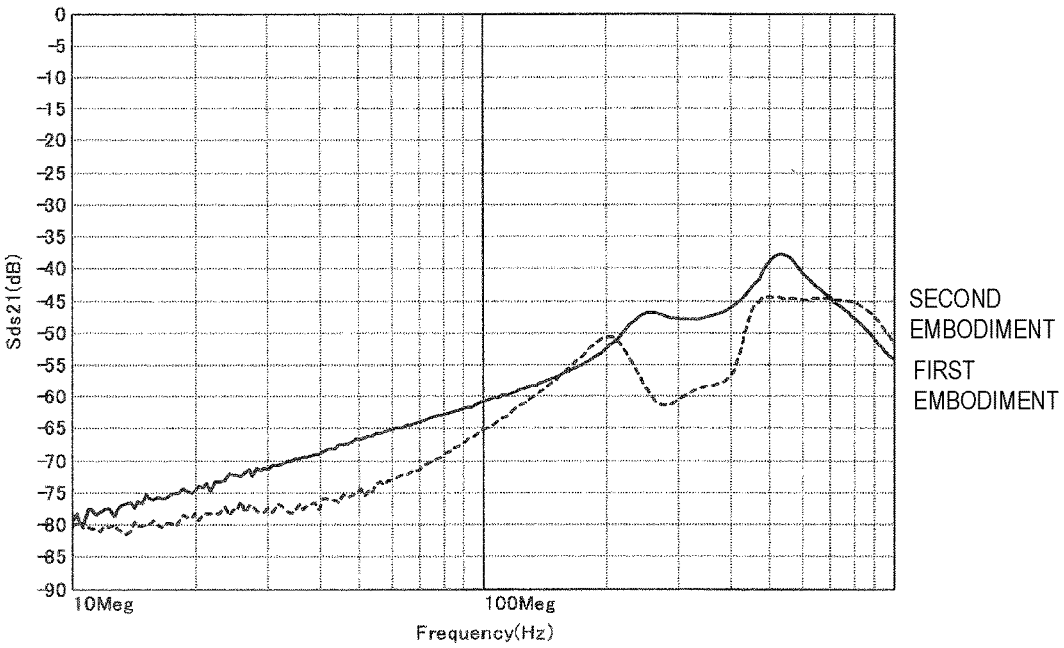
FIG. 7 illustrates a comparison of the frequency characteristics of S (Scattering) parameter (Sds21) between the common mode choke coil illustrated in FIG. 2 and the common mode choke coil illustrated in FIG. 6.

FIG. 7 illustrates the frequency characteristics of the Sds21 of the common mode choke coil 51*a*. In FIG. 7, the Sds21 of the common mode choke coil 51 (first embodiment), which is illustrated also in FIG. 3, is illustrated to readily evaluate the mode conversion characteristics of the common mode choke coil 51*a* (second embodiment). In FIG. 7, the Sds21 of the common mode choke coil 51 (first embodiment) is illustrated by a solid line, and the Sds21 of the common mode choke coil 51*a* (second embodiment) is illustrated by a dotted line.

As illustrated in FIG. 7, the mode conversion characteristics (Sds21) in the second embodiment is improved more than in the first embodiment. The reason for the improvement is presumably that in the second embodiment, the number of the outward transition portions S is larger than in the first embodiment, and the difference between the turn ordinal numbers of portions between the inner layer portion N and the outer layer portion G, at which a line capacitance exists, can be decreased.

Third Embodiment

A common mode choke coil 51*b* according to a third embodiment of the present disclosure will now be described with reference to FIG. 8.

The number of turns of the wire assembly 44 of the common mode choke coil 51*b* is equal to the number, for example, in the common mode choke coil 51 illustrated in FIG. 2. However, the number of the outward transition portions S and inward transition portions T of the common mode choke coil 51*b* is larger than in the common mode choke coil 51.

How to wind the wire assembly 44 in the common mode choke coil 51*b* will now be described by using the turn ordinal numbers in the wire assembly 44 illustrated around the winding core portion 45. Part of the inner layer portion N is first formed between turn 1 and turn 2. One of the outward transition portions S is subsequently formed by a portion between turn 2 and turn 3. One of the first outer layer portions Ga is subsequently formed by turn 3. One of the inward transition portions T is subsequently formed by a portion between turn 3 and turn 4.

Part of the inner layer portion N is subsequently formed between turn 4 and turn 5. Another outward transition portion S is subsequently formed by a portion between turn 5 and turn 6. Another first outer layer portion Ga is subsequently formed between turn 6 and turn 7. Another inward transition portion T is subsequently formed by a portion between turn 7 and turn 8.

Thereafter, the wire assembly 44 is wound repeatedly in the same manner as above. Finally, the rest of the inner layer portion N is formed between turn 28 and turn 29. The other outward transition portion S is subsequently formed by a portion between turn 29 and turn 30. The second outer layer portion Gb is subsequently formed between turn 30 and turn 31.

In the third embodiment, the number of the outward transition portions S is eight, which is larger than in the first embodiment. Consequently, the difference between the turn ordinal numbers of portions between the inner layer portion N and the outer layer portion G, at which a line capacitance exists, can be decreased.

Fourth Embodiment

Figure 9:
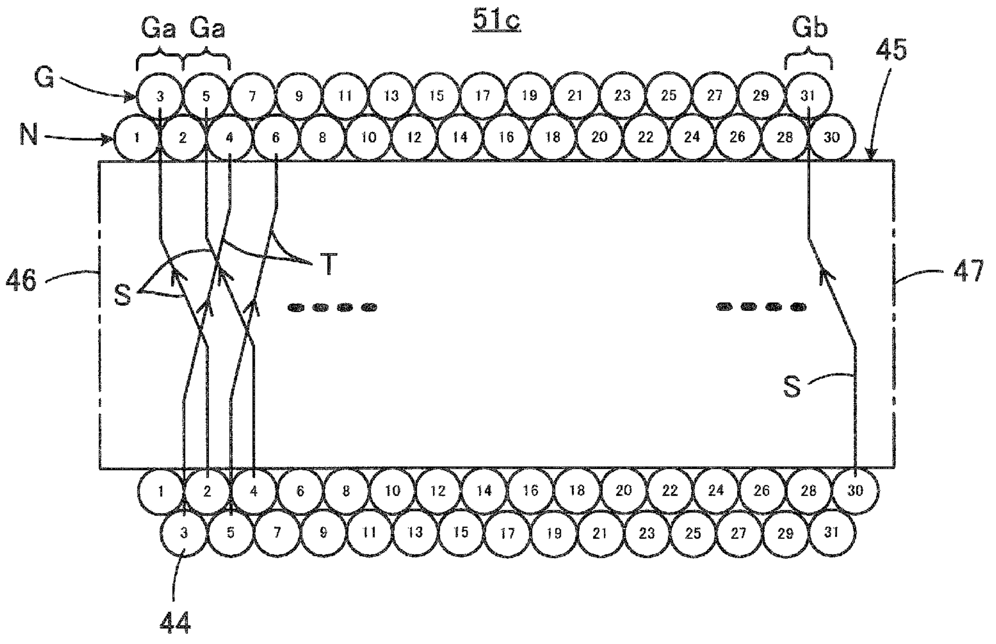
FIG. 9 is a diagram corresponding to FIG. 2 and illustrates a common mode choke coil according to a fourth embodiment of the present disclosure.

A common mode choke coil 51*c* according to a fourth embodiment of the present disclosure will now be described with reference to FIG. 9.

Figure 8:
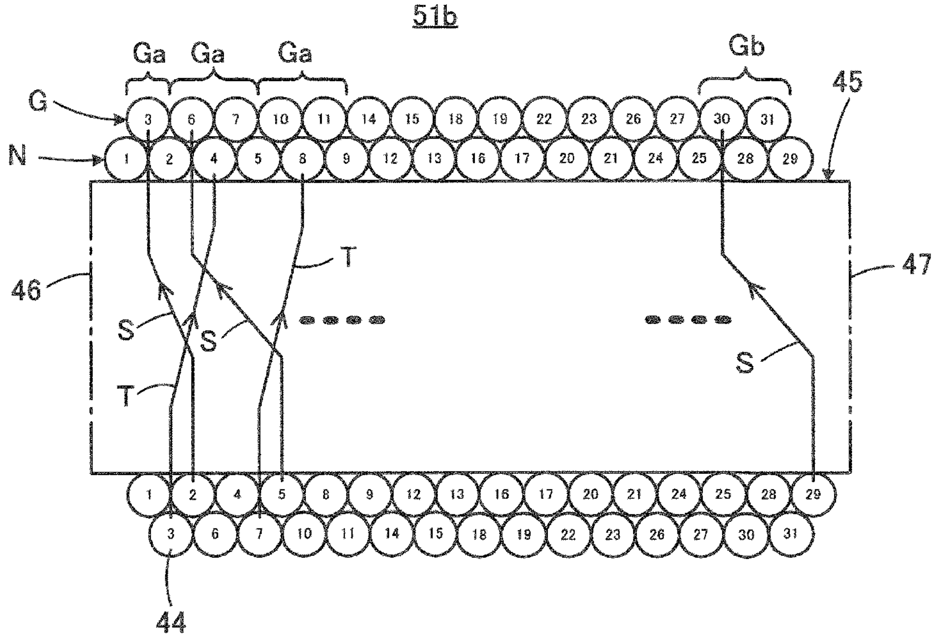
FIG. 8 is a diagram corresponding to FIG. 2 and illustrates a common mode choke coil according to a third embodiment of the present disclosure.

The number of turns of the wire assembly 44 of the common mode choke coil 51*c* is equal to the number, for example, in the common mode choke coil 51*b* illustrated in FIG. 8. However, the number of the outward transition portions S and inward transition portions T of the common mode choke coil 51*c* is larger than in the common mode choke coil 51*b*.

How to wind the wire assembly 44 in the common mode choke coil 51*c* will now be described by using the turn ordinal numbers in the wire assembly 44 illustrated around the winding core portion 45. Part of the inner layer portion N is first formed between turn 1 and turn 2. One of the outward transition portions S is subsequently formed by a portion between turn 2 and turn 3. One of the first outer layer portions Ga is subsequently formed by turn 3. One of the inward transition portions T is subsequently formed by a portion between turn 3 and turn 4.

Part of the inner layer portion N is subsequently formed by turn 4. Another outward transition portion S is subsequently formed by a portion between turn 4 and turn 5. Another first outer layer portion Ga is subsequently formed by turn 5. Another inward transition portion T is subsequently formed by a portion between turn 5 and turn 6.

Thereafter, the wire assembly 44 is wound repeatedly in the same manner as above. Finally, the rest of the inner layer portion N is formed by turn 30. The other outward transition portion S is subsequently formed by a portion between turn 30 and turn 31. The second outer layer portion Gb is subsequently formed by turn 31.

In the fourth embodiment, the number of the outward transition portions S is 15, which is larger than in the third embodiment. Consequently, the difference between the turn ordinal numbers of portions between the inner layer portion N and the outer layer portion G, at which a line capacitance exists, can be further decreased.

Fifth Embodiment

Figure 10:
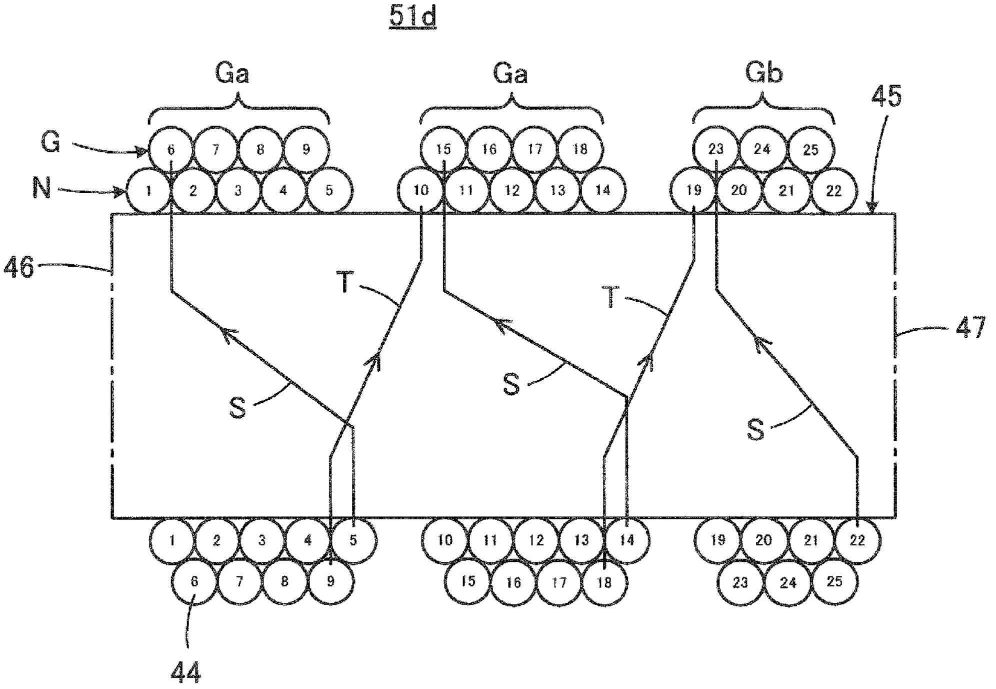
FIG. 10 is a diagram corresponding to FIG. 2 and illustrates a common mode choke coil according to a fifth embodiment of the present disclosure.

A common mode choke coil 51*d* according to a fifth embodiment of the present disclosure will now be described with reference to FIG. 10.

The number of turns of the wire assembly 44 of the common mode choke coil 51*d* is smaller than the number, for example, in the common mode choke coil 51 illustrated in FIG. 2. However, the number of the outward transition portions S and inward transition portions T of the common mode choke coil 51*d* is equal to the number in the common mode choke coil 51. In the common mode choke coil 51*d*, the inner layer portion N and the outer layer portion G are each divided into three groups, and a space is formed between the adjoining groups.

How to wind the wire assembly 44 in the common mode choke coil 51*d* will now be described by using the turn ordinal numbers in the wire assembly 44 illustrated around the winding core portion 45. Part of the inner layer portion N is first formed between turn 1 and turn 5. One of the outward transition portions S is subsequently formed by a portion between turn 5 and turn 6. One of the first outer layer portions Ga is subsequently formed between turn 6 and turn 9. One of the inward transition portions T is subsequently formed by a portion between turn 9 and turn 10. A space is formed between turn 9 and turn 10.

Part of the inner layer portion N is subsequently formed between turn 10 and turn 14. Another outward transition portion S is subsequently formed by a portion between turn 14 and turn 15. Another first outer layer portion Ga is subsequently formed between turn 15 and turn 18. Another inward transition portion T is subsequently formed by a portion between turn 18 and turn 19. A space is formed between turn 18 and turn 19.

The rest of the inner layer portion N is subsequently formed between turn 19 and turn 22. The other outward transition portion S is subsequently formed by a portion between turn 22 and turn 23. The second outer layer portion Gb is subsequently formed between turn 23 and turn 25.

The fifth embodiment contributes to the diversification of the embodiments of the present disclosure. Specifically, the fifth embodiment demonstrates that the intermediate position of the inner layer portion N from which each outward transition portion S extends and the intermediate position of the inner layer portion N to which each inward transition portion T extends are not restricted to a point and may also be a range. That is, each of the two positions does not necessarily correspond exactly to a point. The intermediate position may correspond to the range between the point from which each outward transition portion S extends and the point to which each inward transition portion T extends, for example, the range from turn 5 to turn 10 and the range from turn 14 to turn 19 in the fifth embodiment.

Sixth Embodiment

Figure 11:
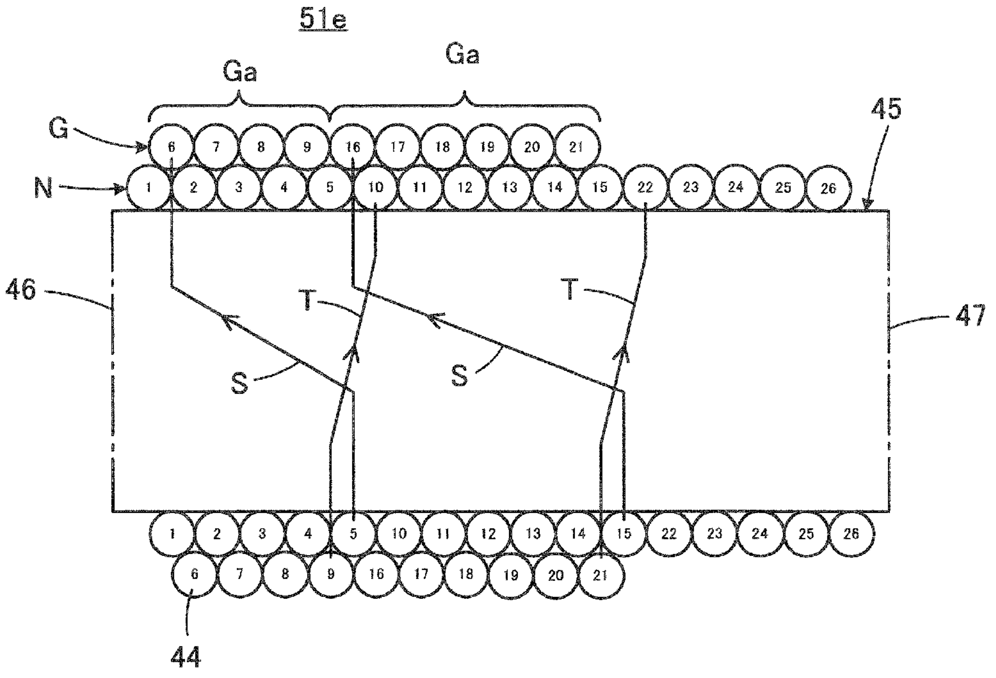
FIG. 11 is a diagram corresponding to FIG. 2 and illustrates a common mode choke coil according to a sixth embodiment of the present disclosure.

A common mode choke coil 51*e* according to a sixth embodiment of the present disclosure will now be described with reference to FIG. 11.

The common mode choke coil 51*e* does not include the second outer layer portion Gb unlike, for example, the common mode choke coil 51 illustrated in FIG. 2. Accordingly, the number of turns of the wire assembly 44 is small. In the common mode choke coil 51*e*, the wire assembly 44 is wound from turn 1 to turn 26 in the same manner as in the common mode choke coil 51 illustrated in FIG. 2. Turn 26 is the final turn.

The sixth embodiment contributes to the diversification of the embodiments of the present disclosure.

Seventh Embodiment

Figure 12:
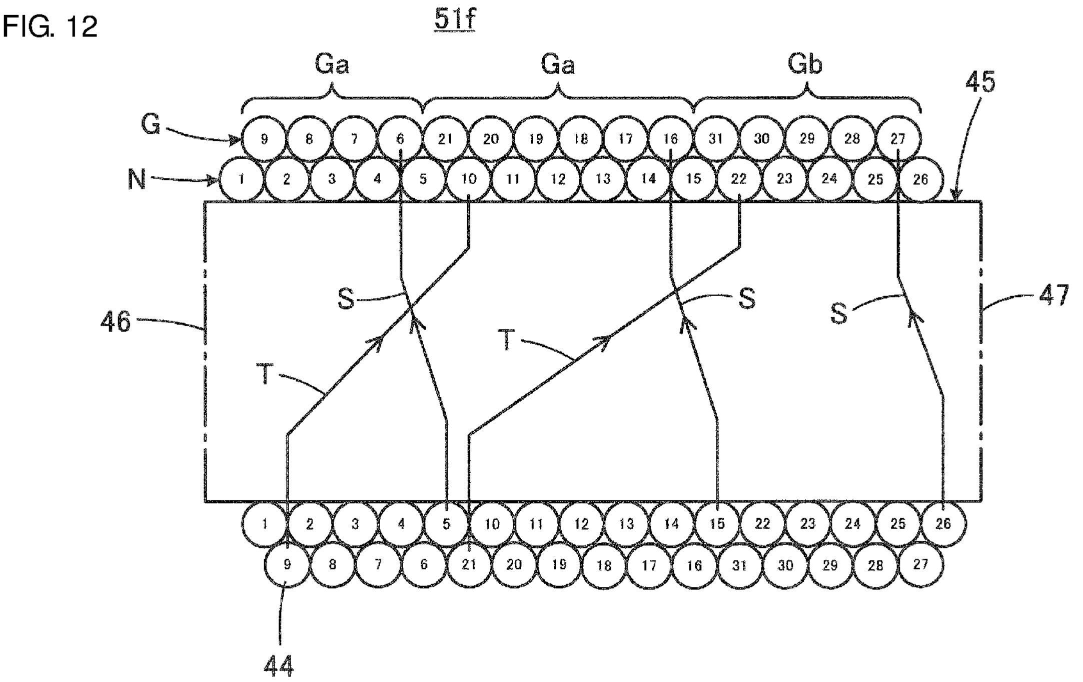
FIG. 12 is a diagram corresponding to FIG. 2 and illustrates a common mode choke coil according to a seventh embodiment of the present disclosure.

A common mode choke coil 51*f* according to a seventh embodiment of the present disclosure will now be described with reference to FIG. 12.

The number of turns of the wire assembly 44 of the common mode choke coil 51*f* is equal to the number, for example, in the common mode choke coil 51 illustrated in FIG. 2. However, the outer layer portion G is wound in the direction opposite to the direction in which the outer layer portion G in the common mode choke coil 51 is wound. That is, the wire assembly 44 at the outer layer portion G is wound so as to extend in the direction from the second end portion 47 to the first end portion 46.

How to wind the wire assembly 44 in the common mode choke coil 51*f* will now be described by using the turn ordinal numbers in the wire assembly 44 illustrated around the winding core portion 45. Part of the inner layer portion N is first formed between turn 1 and turn 5. One of the outward transition portions S is subsequently formed by a portion between turn 5 and turn 6. One of the first outer layer portions Ga is subsequently formed between turn 6 and turn 9. One of the inward transition portions T is subsequently formed by a portion between turn 9 and turn 10. Turn 6 to turn 9 extend in the direction from the second end portion 47 to the first end portion 46.

Part of the inner layer portion N is subsequently formed between turn 10 and turn 15. Another outward transition portion S is subsequently formed by a portion between turn 15 and turn 16. The other first outer layer portion Ga is subsequently formed between turn 16 and turn 21. The other inward transition portion T is subsequently formed by a portion between turn 21 and turn 22. Turn 16 to turn 21 extend in the direction from the second end portion 47 to the first end portion 46.

The rest of the inner layer portion N is subsequently formed between turn 22 and turn 26. The other outward transition portion S is subsequently formed by a portion between turn 26 and turn 27. The second outer layer portion Gb is subsequently formed between turn 27 and turn 31. Turn 27 to turn 31 extend in the direction from the second end portion 47 to the first end portion 46.

In the common mode choke coil 51*f*, the wire assembly 44 at the outer layer portion G is wound so as to extend in the direction from the second end portion 47 to the first end portion 46. Accordingly, the difference between the turn ordinal numbers of some adjoining turns between part of the wire assembly 44 forming the outer layer portion G and part of the wire assembly 44 forming the inner layer portion N disposed inside the outer layer portion G is much larger than in the case of the common mode choke coil 51 in FIG. 2, in which the wire assembly 44 is wound so as to extend in the direction from the first end portion 46 to the second end portion 47. However, the difference between the turn ordinal numbers can be smaller than in the case illustrated in FIG. 19.

In addition, the outward transition portions S can be shorter than in the common mode choke coil 51 in FIG. 2. The outward transition portions S are portions around which the outer layer portion G is wound and are likely to affect a state where the outer layer portion G is wound, unlike the inward transition portions T. Accordingly, in the common mode choke coil 51*f*, a decrease in the length of the outward transition portions S enables variations in the state of the winding to be decreased and enables a decrease in variations in characteristics, a reduction in the size of the coil component, and an improvement in the reliability and manufacturing efficiency.

Eighth Embodiment

Figure 13:
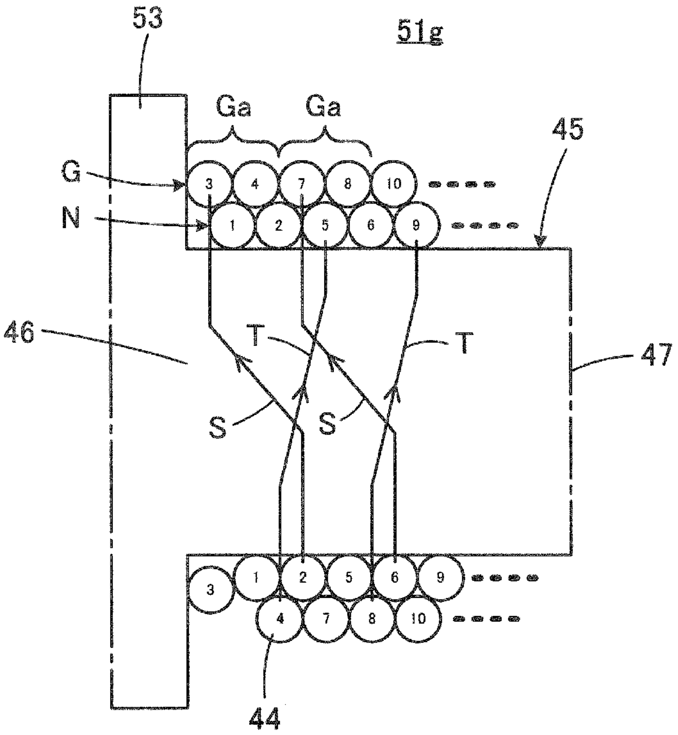
FIG. 13 is a diagram corresponding to FIG. 2 and illustrates a common mode choke coil according to an eighth embodiment of the present disclosure.

A common mode choke coil 51*g* according to an eighth embodiment of the present disclosure will now be described with reference to FIG. 13.

The common mode choke coil 51*g* is characterized by the position of turn 3, which is the first turn in the outer layer portion G adjacent to the first end portion 46. That is, turn 3 is closer than turn 1, which is the first turn in the inner layer portion N adjacent to the first end portion 46, to the first end portion 46. Such a structure can be formed in a manner in which turn 3 is brought into contact with, for example, the first flange portion 53.

How to wind the wire assembly 44 in the common mode choke coil 51*g* will now be described by using the turn ordinal numbers in the wire assembly 44 illustrated around the winding core portion 45. Part of the inner layer portion N is first formed between turn 1 and turn 2. One of the outward transition portions S is subsequently formed by a portion between turn 2 and turn 3. One of the first outer layer portions Ga is subsequently formed between turn 3 and turn 4. One of the inward transition portions T is subsequently formed by a portion between turn 4 and turn 5.

Part of the inner layer portion N is subsequently formed between turn 5 and turn 6. Another outward transition portion S is subsequently formed by a portion between turn 6 and turn 7. Another first outer layer portion Ga is subsequently formed between turn 7 and turn 8. Another inward transition portion T is subsequently formed by a portion between turn 8 and turn 9.

Thereafter, the wire assembly 44 is wound repeatedly in the same manner as above.

The eighth embodiment contributes to the diversification of the embodiments of the present disclosure.

Ninth Embodiment

Figure 14:
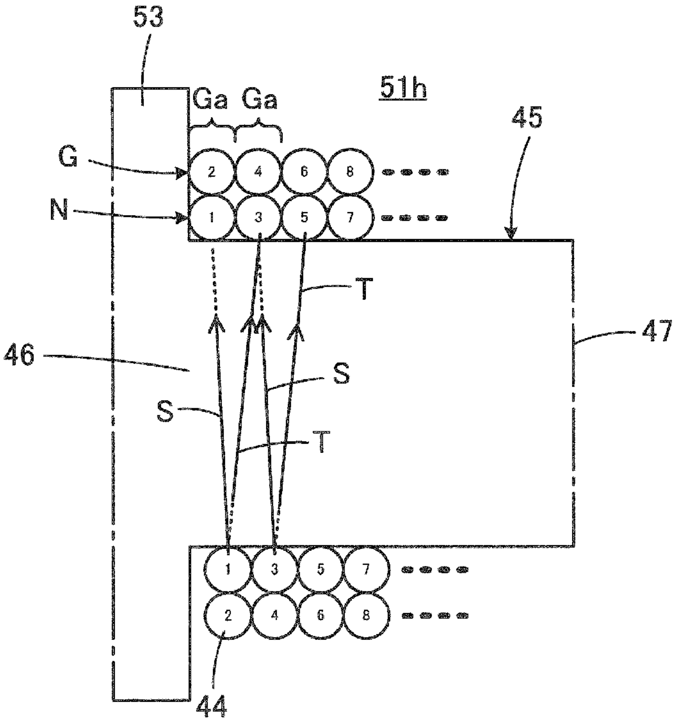
FIG. 14 is a diagram corresponding to FIG. 2 and illustrates a common mode choke coil according to a ninth embodiment of the present disclosure.

A common mode choke coil 51*h* according to a ninth embodiment of the present disclosure will now be described with reference to FIG. 14.

In the first to eighth embodiments, the turns of the wire assembly 44 forming the outer layer portion G are fitted into corresponding recesses formed between the adjoining turns of the wire assembly 44 forming the inner layer portion N. The ninth embodiment is characterized in that each turn of the wire assembly 44 forming the outer layer portion G and the corresponding turn of the wire assembly 44 forming the inner layer portion N are aligned in the radial direction of the winding core portion 45. This arrangement is difficult to achieve by using a singled-state wire but relatively easy to achieve by using the wire assembly 44. The reason is that the wire assembly 44 has an uneven surface that enables the turns to catch on each other.

How to wind the wire assembly 44 in the common mode choke coil 51*h* will now be described by using the turn ordinal numbers in the wire assembly 44 illustrated around the winding core portion 45. Part of the inner layer portion N is first formed by turn 1. One of the outward transition portions S is subsequently formed by a portion between turn 1 and turn 2. One of the first outer layer portions Ga is subsequently formed by turn 2. One of the inward transition portions T is subsequently formed by a portion between turn 2 and turn 3.

Part of the inner layer portion N is subsequently formed by turn 3. Another outward transition portion S is subsequently formed by a portion between turn 3 and turn 4. Another first outer layer portion Ga is subsequently formed by turn 4. Another inward transition portion T is subsequently formed by a portion between turn 4 and turn 5.

Thereafter, the wire assembly 44 is wound repeatedly in the same manner as above.

The ninth embodiment contributes to the diversification of the embodiments of the present disclosure. In particular, in the case of the ninth embodiment, the difference between the turn ordinal numbers of portions at which a line capacitance exists can be greatly decreased. In addition, in the case of the ninth embodiment, the number of turns of the wire assembly 44 can be increased without changing the length of the winding core portion 45. Accordingly, in the ninth embodiment, good mode conversion characteristics can be achieved, and a high inductance can be achieved.

Tenth Embodiment

Figure 15:
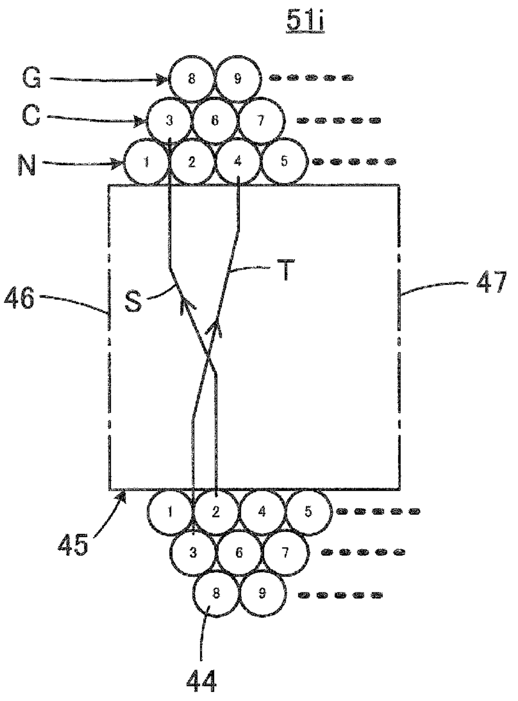
FIG. 15 is a diagram corresponding to FIG. 2 and illustrates a common mode choke coil according to a tenth embodiment of the present disclosure.

A common mode choke coil 51*i* according to a tenth embodiment of the present disclosure will now be described with reference to FIG. 15.

The common mode choke coil 51*i* is characterized in that the wire assembly 44 is wound in three layers.

How to wind the wire assembly 44 in the common mode choke coil 51*i* will now be described by using the turn ordinal numbers in the wire assembly 44 illustrated around the winding core portion 45. Part of the inner layer portion N is first formed between turn 1 and turn 2. One of the outward transition portions S is subsequently formed by a portion between turn 2 and turn 3. One of intermediate layer portions C is subsequently formed by turn 3. One of the inward transition portions T is subsequently formed by a portion between turn 3 and turn 4.

Part of the inner layer portion N is subsequently formed between turn 4 and turn 5. Another outward transition portion S is subsequently formed by a portion between turn 5 and turn 6. Another intermediate layer portion C is subsequently formed between turn 6 and turn 7. Another outward transition portion S is subsequently formed by a portion between turn 7 and turn 8.

Part of the outer layer portion G is subsequently formed between turn 8 and turn 9. Thereafter, the wire assembly 44 is wound repeatedly in the same manner as above.

The tenth embodiment contributes to the diversification of the embodiments of the present disclosure.

Figure 16A:
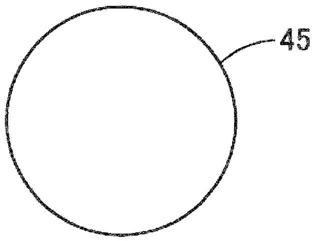
FIG. 16A is a diagram illustrating a preferred example of the sectional shape of a winding core portion.
Figure 16B:
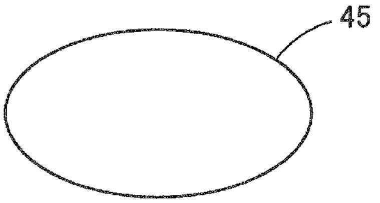
FIG. 16B is a diagram illustrating a preferred example of the sectional shape of the winding core portion.
Figure 16C:
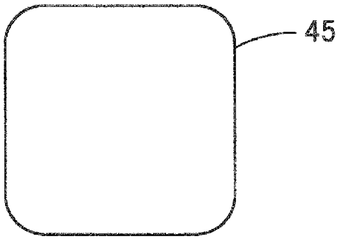
FIG. 16C is a diagram illustrating a preferred example of the sectional shape of the winding core portion.

FIG. 16A, FIG. 16B, and FIG. 16C illustrate preferred examples of the sectional shape of the winding core portion 45 in the direction perpendicular to the axial direction of the winding.

The sectional shape of the winding core portion 45 is typically rectangular but is not particularly limited thereto. In the case where the sectional shape of the winding core portion 45 is circular as illustrated in FIG. 16A or is similar to a circle, for example, an ellipse illustrated in FIG. 16B or a polygon with rounded corners illustrated in FIG. 16C, there is an advantage that the twisted state and the shape of the winding of the wire assembly 44 are unlikely to change. In particular, the shape of the winding of a twisted wire portion is likely to change, and the selection of the above sectional shape of the winding core portion 45 brings about a stronger positive effect than in the case where no twisted wire portion is included.

In the common mode choke coil 51 illustrated in FIG. 1A and FIG. 1B, the first terminal electrode 55 and the second terminal electrode 56 are disposed on the first flange portion 53, and the third terminal electrode 57 and the fourth terminal electrode 58 are disposed on the second flange portion 54. However, all of the terminal electrodes may be disposed on one of the flange portions.

Although the present disclosure is described above with the embodiments of the common mode choke coils in the figures, the present disclosure can be applied to a balun and a transformer. The embodiments are described with the figures by way of example. The features can be partially replaced and combined between the embodiments.

It is only necessary for the twisted wire portion, at which the first wire 41 and the second wire 42 are twisted together, to be included in the wire assembly 44 as part of the wire assembly 44. This enables the degradation of the characteristics due to the unbalance of the line capacitance to be suppressed more than in the case where no twisted wire portion is included. From the viewpoint of suppression of the degradation of the characteristics, the ratio of the twisted wire portion to the whole is preferably large. In particular, portions other than the outward transition portions S and the inward transition portions T, that is, each of the inner layer portion N and the outer layer portion G preferably includes the twisted wire portions. It is preferable that the inner layer portion N and the outer layer portion G are twisted. In this case, the state of the winging and the characteristics can be balanced.

However, one of the inner layer portion N and the outer layer portion G may be the twisted wire portion. In particular, in the case where only the outer layer portion G is the twisted wire portion, the inner layer portion N around which another part of the wire assembly 44 is wound may be a non-twisted wire portion, at which the state of the winding is less disordered, and the state of the winding can be improved.

Although almost all of the first wire 41 and the second wire 42 wound around the winding core portion 45 is regarded as the wire assembly 44 in the embodiments, the wire assembly 44 is not limited thereto and may be part of the winding around the winding core portion 45. That is, the first wire 41 and the second wire 42 may be wound around the winding core portion 45 in the opposite directions or wound separately from each other.

Although the number of turns of the first wire 41 is substantially the same as the number of turns of the second wire 42 in the embodiments, the numbers of turns are not limited thereto and may be different from each other.

While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:

a drum-shaped core including a winding core portion and first and second flange portions disposed at respective opposing first and second end portions of the winding core portion; and first and second wires that are wound around the winding core portion and are not electrically connected to each other, wherein the first and second wires form a wire assembly by being wound around the winding core portion together, the wire assembly includes a twisted wire portion at which the first and second wires are twisted together, an inner layer portion that is in contact with and wound around a circumferential surface of the winding core portion, an outer layer portion wound around an outer circumference of the inner layer portion, a plurality of outward transition portions each extending from the inner layer portion to the outer layer portion, and an inward transition portion extending from the outer layer portion to the inner layer portion, the inner layer portion and the outer layer portion are each divided into at least three groups and a space is formed between adjoining groups of the at least three groups, each outward transition portion always directly connects a second end to a first end of a same group of the at least three groups, wherein the first end is opposite to the second end of the same group, and the inward transition portion always directly connects a second end of one of the at least three groups to a first end of an adjoining group of the at least three groups; and the at least three groups include a first group located at the first end portion of the winding core portion, a second group located at the second end portion of the winding core portion, a third group located between the first group and the second group, wherein a number of windings included in the second group is less than a number of windings in both the first and third groups.

* * * * *